United States Patent
Cesareo et al.

(10) Patent No.: US 9,909,015 B2
(45) Date of Patent: Mar. 6, 2018

(54) FLAME RETARDANT COMPOSITION COMPRISING GRAPHENE NANOPLATELETS

(71) Applicant: DIRECTA PLUS S.p.A., Lomazzo (IT)

(72) Inventors: Giulio Cesareo, Como (IT); Maria Riccardo Parrini, Milan (IT); Laura Giorgia Rizzi, Sarrono (IT)

(73) Assignee: DIRECTA PLUS S.P.A., Lomazzo (IT)

( * ) Notice: Subject to any disclaimer, the term of this patent is extended or adjusted under 35 U.S.C. 154(b) by 0 days.

(21) Appl. No.: 14/910,488

(22) PCT Filed: Aug. 7, 2014

(86) PCT No.: PCT/EP2014/067035
§ 371 (c)(1),
(2) Date: Feb. 5, 2016

(87) PCT Pub. No.: WO2015/022262
PCT Pub. Date: Feb. 19, 2015

(65) Prior Publication Data
US 2016/0185981 A1    Jun. 30, 2016

(30) Foreign Application Priority Data
Aug. 14, 2013   (IT) .............................. MI2013A1391

(51) Int. Cl.
*C09D 5/18*     (2006.01)
*C08K 3/04*     (2006.01)
*C09K 21/06*    (2006.01)

(52) U.S. Cl.
CPC .................. *C09D 5/18* (2013.01); *C08K 3/04* (2013.01); *C09K 21/06* (2013.01); *C08K 3/042* (2017.05)

(58) Field of Classification Search
CPC ..................................... C09D 5/18; C08K 3/04
USPC ................................ 524/493, 496; 106/18.23
See application file for complete search history.

(56) References Cited

U.S. PATENT DOCUMENTS

| 2010/0074835 A1 | 3/2010 | Mercuri |
| 2013/0197256 A1 | 8/2013 | Yi-Shuen et al. |

FOREIGN PATENT DOCUMENTS

| CN | 1990824 A | 7/2007 |
| CN | 101631910 A | 1/2010 |
| CN | 102076750 A | 5/2011 |
| CN | 102971370 A | 3/2013 |
| EP | 2 583 997 A1 | 4/2013 |
| WO | WO 92/17419 | 10/1992 |
| WO | WO 2008/105140 A1 | 9/2008 |
| WO | WO 2010/002770 A1 | 1/2010 |

OTHER PUBLICATIONS

State Intellectual Property Office of the P.R. China, "Notification of First Office Action" re: Application No. 2014800438828 of Directa Plus S.P.A. ; dated Jan. 25, 2017, 14 pages.
PCT International Searching Authority, "International Search Report," International Application No. PCT/EP2014/067035, dated Oct. 29, 2014 (5-pgs).
PCT International Searching Authority, "Written Opinion of the International Searching Authority," International Application No. PCT/EP2014/067035, dated Oct. 29, 2014 (8-pgs).
I. Guardia et al., "High-throughput production of pristine graphene in aqueous dispersion assisted by non-ionic surfactants," Carbon, vol. 49 (2011) pp. 1653-1652.
E. Uddin et al., "Effects of various surfactants on the dispersion stability and electrical conductivity of surface modified graphene," Journal of Alloys and Compounds, vol. 5 (2013) pp. 134-142.
G. Huang et al., "How can graphene reduce the flammability of polymer nanocomposites?," Materials Letters, vol. 66 (2012) pp. 187-189.
State Intellectual Property Office of the P.R. China, "Notification of Second Office Action" re: Application No. 2014800438828 of Directa Plus S.P.A. ; dated Sep. 4, 2017, 9 pages.

*Primary Examiner* — Deve E Valdez
(74) *Attorney, Agent, or Firm* — Pillsbury Winthrop Shaw Pittman LLP

(57) ABSTRACT

A flame retardant composition comprising graphene nanoplatelets and a condensation product of a sulfonated aromatic compound with formaldehyde, wherein the w/w ratio between the graphene and the condensation product is in the range of 1:15 to 4:1. The composition may be in the form of a water dispersion applied to the surface of the article to be treated.

The composition has optimal flame retardant properties even when applied in relatively modest quantities.

22 Claims, No Drawings

FLAME RETARDANT COMPOSITION COMPRISING GRAPHENE NANOPLATELETS

CROSS REFERENCE TO RELATED APPLICATIONS

This application claims priority of International Application No. PCT/EP2014/067035, filed Aug. 7, 2014, which in turn claims priority Italian national application number IT2013MI01391, filed Aug. 14, 2013 the disclosures of which are incorporated herein by reference in their entirety.

The present invention refers to a flame retardant composition comprising graphene nanoplatelets and a condensation product of a sulfonated aromatic compound with formaldehyde.

Graphene is a material consisting of a mono-atomic layer of carbon atoms hybridized in $sp^2$ form. They are therefore arranged in compact, hexagonally-packed beehive structures that constitute the fundamental structural elements of graphite, carbon nanotubes and fullerenes.

Graphene is a material with unique properties: it is a zero band-gap semiconductor with a high charge-transport mobility (up to 200,000 $cm^2/Vs$), a very high mechanical resistance (ultimate strength ~40 N/m, Young's modulus ~1.0 TPa), exceptional thermal conductivity (~5000 W/Km), and an excellent capacity for carrying electrical current (~1.2 mA/μm). These properties enable graphene to be used in market segments that require the advanced materials. Graphene-based materials are thus studied from the scientific and industrial standpoint for applications in markets such as electronics, photovoltaics, batteries, sensors, optoelectronics and nanocomposites.

From the scientific and patent literature, there are various known methods for preparing graphene, such as chemical vapour deposition, epitaxial growth, chemical exfoliation and chemical reduction of the oxidized form graphene oxide (GO).

The applicant Directa Plus S.p.A. holds the European patent EP 2 038 209 B1, which describes a method for producing structures comprising layers of graphene, and of the Italian patent application n. MI2013A000334 deposited on Mar. 6, 2013 relating to a concentrated graphene water dispersion.

From the scientific and patent literature, there are known flame retardant compositions based on graphene or containing graphene, in oxidized or intrinsic form.

Y. Shi, L-J Li, *J. Mater. Chem.*, 2011, 21, 3277-3279, report that graphene modified chemically, as graphene oxide (GO), is a promising flame retardant additive but it can also undergo catastrophic reduction due to potassium salt impurities, leading to a self-propagating combustion, which suggests that caution is warranted in its use as a flame retardant.

WO 2010/002770 A1 describes flame retardant polymeric compositions with intumescent graphene. The graphene is added to and mixed with the polymer. e.g. polyethylene, and the mixture is submitted to flame tests that demonstrate its efficacy.

WO 2012/170668 A2 describes inflatable structures made of a lightweight, strong fabric for the production of emergency evacuation slides for aircraft. The fabric is coated with a layer of polyurethane resin containing particles of graphene and a phosphorus-based flame retardant. The coating also contains other components, such as organic solvents, silane derivatives, and antimony oxides. The document contains no details of any flame tests.

US 2013/0101839 A1 describes intumescent compositions for flame retardant coatings comprising expandable graphite, an aromatic polyamine resin and a compound containing phosphorus. The expandable graphite consists of particles with a size of 325 mesh and an expansion volume of at least 15-20 ml/g, and preferably a particle size of 50-100 mesh and an expansion volume of 100-200 ml/g.

Guardia et al: "High-throughput production of pristine graphene in an aqueous dispersion assisted by non-ionic surfactants", Carbon, vol. 49. (2011), 1653-1662, disclose the preparation of aqueous graphene dispersions by exfoliation of pristine graphite in the presence of a wide range of surfactants, including poly(sodium) 4-styrenesulfonate (PSS), 3-[(3-cholamidopropyl)dimethyl ammonio]-1-propanesulfonate (CHAPS), and sodium dodecylbenzene-sulfonate (SDBS). These surfactants are not products of condensation of a sulfonated aromatic compounds with formaldehyde. There is no mention of using these aqueous dispersions of graphene as flame retardants.

Uddin Md. Elias et al: "Effects of various surfactants on the dispersion stability and electrical conductivity of surface modified graphene"; Journal of Alloys and Compounds, vol. 562 (2013), 134-142, disclose water dispersible graphene functionalized with ionic and non-ionic surfactants, including sodium dodecylbenzene-sulfonate (SDBS). These surfactants are not products of condensation of a sulfonated aromatic compounds with formaldehyde. There is no mention of using these aqueous dispersions of graphene as flame retardants.

US 2013/0197256 A1 discloses a method for the preparation of graphene which comprises oxidizing graphite to obtain graphite oxide, suspending the graphite oxide in water in the presence of a surfactant such as SDBS, reducing the graphite oxide to graphene. SDBS is not a product of condensation of a sulfonated aromatic compounds with formaldehyde. There is no mention of using the aqueous dispersions of graphene as flame retardant.

Guobo Huang et al; "How can graphene reduce the flammability of polymer nanocomposites?". Materials Letter, vol. 66, (2012), 187-189, disclose that nanocomposites based on PVA and graphene nanosheets have been evaluated as flame retardants. The nanocomposites were prepared by dispersing graphene oxide (GO) in a solution of sodium dodecyl sulfate (SDS) in an undisclosed solvent, then reducing the GO with hydrazine to obtain graphene nanosheets. SDS is not product of condensation of a sulfonated aromatic compounds with formaldehyde.

From the above-mentioned literature, it is clear that graphene is used alone as a flame retardant agent, in either oxidized or pristine form, or in combination with at least one phosphorus compound, or blended in bulk with PVA in a sodium dodecylsulfate solution.

As concerns the flame retardant compositions for applying as a coating on the surface of products, the above-mentioned prior art mainly describes the formulation of these compositions in organic solvents. The hydrophobic nature of graphene leads to the use of water being avoided as a fluid medium for the dispersion of the flame retardant compounds. This hydrophobic nature prompts the use of organic solvents, which are expensive and troublesome as regards personal and environmental safety issues.

The industry, and the polymeric materials sector in particular, demand the availability of fireproof materials in numerous fields of application. This orients research on the conception and development of increasingly high-performance and safe flame retardant compositions, especially in consideration of the fact that articles made of polymeric materials are usually readily combustible.

It would therefore be desirable to have a flame retardant composition that is effective even when used in relatively small quantities, and easy to apply, particularly as a coating on articles made of polymeric materials.

One object of the present invention is thus to produce a flame retardant composition comprising graphene nanoplatelets that offers an excellent performance in flame tests, particularly when used with polymeric materials.

Another object of the present invention is to produce a flame retardant composition suitable for use as a coating on materials, and particularly on polymeric materials.

Another object of the present invention is to provide a process for the preparation of a flame retardant composition as described above.

The above-mentioned and other objects and advantages of the invention are achieved with a flame retardant composition comprising graphene nanoplatelets and a condensation product of a sulfonated aromatic compound with formaldehyde, wherein the weight-to-weight (w/w) ratio of the graphene to the condensation product is in the range of 1:15 to 4:1, preferably from 1:10 to 2:1, and more preferably from 1:5 to 1:1.

According to an aspect of the invention, the flame retardant composition comprises graphene nanoplatelets and a condensation product of a sulfonated aromatic compound with formaldehyde and urea, wherein the starting mixture of the three components before the condensation reaction is represented by the following formula:

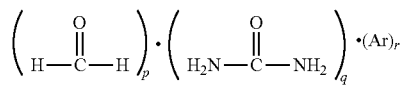
(I)

wherein:
Ar is a sulfonated aromatic compound selected from the group consisting of:

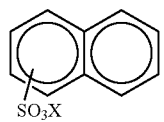
(Ia)

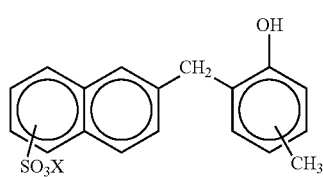
(Ib)

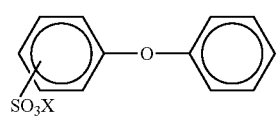
(Ic)

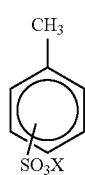
(Id)

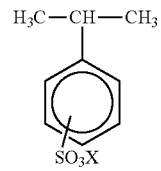
(Ie)

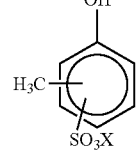
(If)

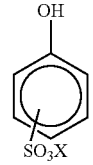
(Ig)

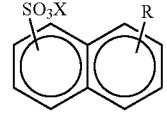
(Ih)

X is the cation of a metal that forms a salt with the sulfonated group, and X is preferably the cation of an alkali metal, and more preferably sodium;

R is an alkyl group with from 1 to 12 carbon atoms, linear or branched;

p, q and r are the moles of formaldehyde, urea and sulfonated aromatic compound, respectively, with a ratio p/r from 0.2 to 4, preferably from 0.5 to 2; and a ratio q/r from 0.5 to 5, preferably from 1 to 3, in which q can be equal to 0.

when q=0 the product is obtained by condensation of a sulfonated aromatic compound and formaldehyde only.

According to an aspect of the invention the condensation product is a sulfonated aromatic compound with formaldehyde having the following formula (II)

$$(Ar-CH_2-)_n-Ar \quad (II)$$

wherein:
Ar is as defined above;
n is from 1 to 100.

The condensation product of a sulfonated aromatic compound with formaldehyde, and optionally urea, is typically a polymer with a weight average molecular weight Mw up to 15,000, preferably up to 10,000.

The molecular weight of the condensation product, expressed in terms of weight-average molecular weight Mw, was determined by preparing a 0.2% aqueous solution thereof and measuring it by liquid chromatography. As the standard substance, polystyrene sodium sulfonate was used. The measurement conditions for liquid chromatography were as follows:
Column type: G4000SW$_{XL}$+G2000SW$_{XL}$(7.8φ×300 mm)
Eluent: 30 mM aqueous sodium acetate solution/acetonitrile=6/4
Flow rate: 0.7 ml/min
Detector: UV 280 nm In the condensation product with formaldehyde and optionally urea, the sulfonated aromatic compound can be only one of the compounds Ar defined above, or can be a mixture of two or more such compounds.

In the formula (I) or (II) above R is preferably a linear alkyl group $C_1$-$C_6$, more preferably methyl.

According to one aspect of the invention, the flame retardant composition is in the form of a water dispersion in which the concentration of graphene nanoplatelets is in the range of 1% to 40% w/w, and the concentration of the condensation product is in the range of 1% to 40% w/w, providing the previously-defined w/w ratio of graphene nanoplatelets to condensation product is compatible with these ranges of variability in the concentrations of the single components. If, for instance, the concentration of graphene nanoplatelets is the maximum concentration of 40% w/w, the ratio of graphene nanoplatelets to condensation product may be no less than 1:1.

In this case the composition is applied to the surface of an article to be treated so that, after the water has been removed, a protective flame retardant layer is formed on the treated article.

When the composition is in dry solid form, on the other hand, it can be mixed in bulk with the polymer or mixture of polymers before molding—or otherwise forming—the end product required.

The term "flame retardant" describes the specific function of a product or composition that increases the resistance of a material, and particularly of a polymeric material, to normal flammability or combustion. This function can consist either in affording a greater resistance to the ignition of a flame or in a slower propagation of the flame after its ignition, or both.

The presence of a vast range of flame retardant agents is due to the fact that the materials needing flame resistance differ considerably in nature and composition. A number of aspects have to be considered in the choice of a flame retardant, such as the polymer's temperature of autocombustion and decomposition, the influence on the physical properties of the material, the effects on human health, and so on.

There are numerous methods for testing the function and performance of a flame retardant. The ASTM has classified more than 100 methods for testing the flammability of a material. One of the methods most often used, also for its simplicity, is the Underwriters Laboratory method UL94 that comprises a horizontal test (UL94HB) and a more severe vertical test (UL94V). This method corresponds to the ASTM method D635.

There are two main methods for adding a flame retardant to a polymeric material: a) by adding it to the polymeric mass, before or during the product-forming step, so that the additive is dispersed in the product after it has been formed; or b) by applying it to the surface of the product or polymer, either by grafting or by simple physical surface deposition to form a coating. The choice of additives varies, depending on the characteristics of the polymer, the flame retardant, and the end product being formed, as is well known to any person skilled in the art.

The term "graphene nanoplatelets" is used in the present description to mean a nanomaterial consisting of particles of one or more mono-atomic layers of carbon arranged in a compact bidirectional hexagonal network with the following characteristics:

at least 90% of said particles of graphene have a lateral size (x, y) from 200 to 20000 nm, and a thickness (z) from 0.34 to 30 nm, the lateral size always being greater than the thickness (x, y>z);

the C/O ratio in said graphene particles is $\geq$10:1, and preferably $\geq$100:1;

The condensation products of a sulfonated aromatic compound with formaldehyde and optionally urea are products known to a skilled person and available on the market from several sources. They are also known as dispersing agents. They consequently contribute to dispersing the graphene nanoplatelets, which is an intrinsically hydrophobic material, in the water medium in which it is dispersed.

According to one embodiment of the invention, the water dispersion of the flame retardant composition comprises graphene nanoplatelets with the above-described characteristics.

The above-mentioned dispersion of graphene nanoplatelets in water can be prepared by means of a process that comprises the expansion of intercalated graphite flakes having a lateral size $\leq$500 µm by exposing them to a temperature of at least 1300° C. for a time of less than 1 second, and it is characterized in that:

a) the expanded graphite thus obtained is dispersed in water at a concentration in the range of 1% to 40% w/w, in the presence of a dispersing agent comprising a condensation product of a sulfonated aromatic compound with formaldehyde in a w/w ratio from 1:15 to 4:1 of the weight of said graphite;

b) the water dispersion obtained in step (a) is submitted to ultrasound treatment with an energy level in the range of 100 to 2000 W for a time lasting between 1 and 100 hours.

The dispersing agent used in step (a) is preferably a condensation product of a sulfonated aromatic compound having the formula (I) with formaldehyde, and more preferably it is the compound having the formula (Ia).

The above-mentioned process enables a dispersion of graphene nanoplatelets and condensation product according to the formula (I) to be obtained with the above defined characteristics.

In the present description, the graphene nanoplatelets are defined dimensionally with reference to a system of Cartesian coordinates x, y, z, on the understanding that the particles are substantially flat platelets, though they can also have irregular shapes. In any case, the lateral size and thickness given with reference to the directions x, y and z are meant as the maximum dimensions in each of the aforesaid directions.

The lateral sizes (x, y) of the graphene nanoplatelets are established from direct measurements under the scanning electron microscope (SEM), after diluting the dispersion in a ratio of 1:1000 in deionised water and pouring it drop by drop onto a silicon oxide substrate on a plate heated to 100° C.

The thickness (z) of the graphene nanoplatelets is ascertained under the atomic force microscope (AFM), which is essentially a profile meter with a subnanometric resolution, widely used for the (mainly morphological) characterization of surfaces and nanomaterials. This type of analysis is commonly used both in the academic setting and for industrial research, to assess the thickness of graphene flakes, howsoever produced, and thereby arrive at the number of layers comprising the flake (single layer=0.34 nm).

The particles in the dispersion, deposited as described for the SEM analysis, are scanned directly using an AFM tip, the measurement providing a topographical image of the graphene flakes and of their profile in relation to the substrate, and thus enabling a precise measurement of their thickness.

In the dispersion according to the invention, at least 90% of the graphene nanoplatelets preferably have a lateral size (x, y) from 500 to 10000 nm, and more preferably from 1000 to 5000 nm. In the dispersion according to the invention, the graphene nanoplatelets preferably have a thickness (z) from 0.34 to 20 nm, and more preferably from 0.34 to 15 nm.

In any case, the lateral size is always greater than the thickness (x, y>z).

In the dispersion according to the invention, the C/O ratio in said graphene particles is ≥10:1; and preferably ≥50:1, and more preferably ≥100:1. This ratio is important because it defines the maximum quantity of oxygen bonded to the carbon comprising the graphene, i.e. of graphene oxide. It is common knowledge, in fact, that the best properties of the graphene are obtained when the quantity of graphene oxide is minimal.

The C/O ratio in the graphene nanoplatelets of the dispersion according to the invention is ascertained by elemental analysis using inductively-coupled plasma mass spectrometry (ICP-MS), which provides the w/w percentages of the various elements. Normalizing the values obtained to the atomic weight of the C and O species, and establishing their ratio, provides the C/O ratio.

The condensation product of a sulfonated aromatic compound with formaldehyde, and in particular of a sulfonated aromatic compound according to the formula (I), belongs to a class of compounds widely used as a dispersing agent in various applications, such as in the dispersion of pigments and stains, plasticizers, abrasive powders, and it is used in dyeing processes and in the treatment of textile fibres and fabrics, in polymerization processes, in the emulsion of synthetic rubbers, and so on.

There are no reports in the literature of this type of compound being used in the flame retardant sector, which is thus an unexpected and surprising aspect of the present invention.

The condensation products of a sulfonated aromatic compound with formaldehyde, including the condensation product according to the formula (I), are prepared with methods known to a person skilled in the art.

A typical process comprises a first step involving the sulfonation reaction of the aromatic compound Ar, e.g. naphthalene, with sulfuric acid, and the subsequent reaction of the sulfonated aromatic compound with formaldehyde, in suitable molar ratios, in a water solution. The solution is then neutralized and, if necessary, dried to obtain the condensation product Ar—$CH_2$—Ar. This process enables the preparation, for instance, of the compound (Ia). The other products of condensation (Ib-1g) can be prepared using the same method, choosing the aromatic compound required from among the polynuclear or mononuclear aromatic compounds according to the above-mentioned formulas. Examples of these synthetic processes can be found, for instance, in GB 1043490, GB 1420520, U.S. Pat. No. 4,214,972.

The condensation products of sulfonated aromatic compounds with formaldehyde for use as dispersants are usually commercially available. The condensation product according to the formula (Ia) is marketed under the brand name Setamol WS by BASF AG.

The water dispersion of the flame retardant composition according to the invention, comprising graphene and a condensation product of a sulfonated aromatic compound with formaldehyde, including the condensation product according to the formula (I), can be prepared by dispersing graphene with the required characteristics in water together with the condensation product that serves as a dispersant.

According to one characteristic of the invention, the flame retardant composition is dispersed by means of a process in several steps that also comprises the preparation of the graphene nanoplatelets directly, starting from graphite, as explained above.

In this case, the first step in the process consists in the preparation of expanded and/or exfoliated graphite, starting from intercalated graphite.

The intercalated graphite can be prepared using methods known to a person skilled in the art, or purchased from the market. The intercalated graphite expansion step is achieved by submitting flakes of intercalated graphite (graphite intercalation compounds, GICs) with a lateral size ≤500 μm to a temperature of at least 1300° C. for a time of less than 1 second. This treatment is achieved as described in the patent EP 2 038 209 B1. i.e. by generating heat in the GICs, preferably by means of an electric arc, a microwave or high-frequency induction oven, or by plasma formation. This last treatment is particularly preferred because it offers the opportunity to achieve the required temperature associated with a high turbulence.

The second step in the process comprises the dispersion of the expanded graphite obtained in the first step in water. The dispersion is obtained by means of a gentle stirring.

The dispersion is achieved in the presence of a dispersing agent consisting preferably of the condensation product according to the formula (I).

As seen previously, the content of condensation product of a sulfonated aromatic compound with formaldehyde in the above-mentioned dispersion is in a w/w ratio with the graphene nanoplatelets from 1:15 to 4:1, and it is dissolved in the final dispersion.

The expanded graphite is dispersed in water at a concentration from 1% to 40% w/w, and preferably from 5% to 35% w/w, and more preferably from 10% to 20% w/w.

The concentration of condensation product according to the formula (I) in the final dispersion of the flame retardant composition thus varies from 1% to 40% w/w.

The third step in the process comprises ultrasound treatment of the water dispersion obtained from the previous step at an energy level from 100 to 2000 W for a time in the range of 1 to 100 hours.

The ultrasound treatment of the water dispersion of expanded graphite is preferably done at an energy level in the range of 200 and 1000 W for a time between 2 and 80 hours.

The ultrasound treatment is done using equipment such as commercial ultrasonicators for the treatment of liquids, where the acoustic energy is transmitted to the system by cavitation (the formation and implosion of bubbles) using a sonotrode immersed in the liquid, with a wave frequency of around 24 kHz, and a power as defined above.

The combination of the high-temperature expansion treatment on the intercalated graphite and of the subsequent ultrasonication treatment in the water medium enables both the exfoliation of the graphite and its dimensional reduction, obtaining nanoplatelets of graphene already dispersed in water within a relatively short time.

In addition, the above-described process enables water dispersions of graphene nanoplatelets to be obtained at higher concentrations than those achieved with the known processes.

The final dispersion in which the ratio of graphene nanoplatelets to condensation product is as required, i.e. in the range of 1:15 to 4:1, is either used as is, applied as a coating to polymeric products to make them fireproof, or it is further treated to remove the water content and obtain a flame retardant composition in dry powder form.

When applied as a coating, the suspension is spread or sprayed onto the surface of the article to be treated in sufficient quantity to deposit a layer of the composition that, after the water has been removed by evaporation or other means of elimination thereof, suffices to exert an adequate flame retardant function.

This quantity can be assessed and measured—as a first approximation—by applying the composition to polymer specimens suitable for performing flammability tests according to the previously-quoted standard methods. UL94HB and UL94V, corresponding to the ASTM method D635.

For the purpose of these standard methods, a specimen with a parallelepiped shape and standard size is exposed to a free flame produced by a Bunsen burner. The propagation of the flame is observed and measured, recording the time or the distance to which the flame advances in the specimen, which is attached horizontally or vertically to a clamp at the end opposite the one exposed to the flame.

The method also enables an assessment of any dropping of the flame from the specimen and consequent ignition of a layer of cotton placed underneath it.

In the ASTM method D635, the specimen used is 125 mm long, 30 mm wide, and has a thickness that depends on the material involved. There is a direct proportionality between the ignition and extinguishing of the specimens, i.e. the narrower the thickness of the specimen, the sooner it is ignited and the sooner the flame extinguishes itself.

In the horizontal flammability test, the specimen is placed horizontally and tilted at an angle of 45°. The test measures the rate of combustion of the material as the flame front advances between two reference points located at 25 mm and 100 mm. The flame is applied to one end of the specimen for a standard ignition time of 30 seconds. A specimen with a thickness in the range of 3 mm to 13 mm is classified as HB if the rate of combustion does not exceed 40 mm/minute, or if the flame front extinguishes itself before reaching the sign located at 100 mm. At the same time, there must be no dropping of the flame capable of igniting the cotton underneath. In the case of a vertical test, the specimen is positioned vertically and held by a clamp located at the upper end of the specimen. The flame is applied to the lower end of the specimen for a period of 10 seconds, and then removed. The material is classified with the highest standard V-0 if the flame extinguishes within 10 seconds of the source being removed, and no drops of flame fall from the specimen onto the cotton underneath. The classification V-1 requires that the flame extinguish itself within 30 seconds of the source being removed and that no drops of flame fall on the cotton underneath. The classification V-2, is less restrictive and requires the same performance as for V-1 but allows for the cotton underneath to be ignited by drops of flame developing in the meantime.

A specimen of the above-described shape and size can be coated with variable quantities of a flame retardant composition in order to assess the quantity of the composition needed to obtain the required effect.

The coating can be done by immersing the specimen in the flame retardant composition, or by painting its surface, depending on the degree of affinity between the polymeric specimen and the composition, which correlates with their hydrophobia and the compactness of the polymer. The coating must involve the whole exposed surface of the specimen and must be homogeneous in order to form a compact barrier.

As a rule, the quantity of dried composition deposited on the polymer specimen that is needed to pass the flammability test according to the above-described standard method varies from 1% al 40% w/w of the specimen concerned. This quantity naturally varies as a function of the type of polymer material, so the optimal quantity must be established case by case. As a consequence, a quantity of water dispersion of the flame retardant composition at a suitable concentration is used such that, after deposition on the specimen and removal of the water, a layer of the required quantity of dried composition forms on the specimen.

The invention is now described by means of several embodiments, given purely as examples.

EXAMPLE 1

Preparation of the Dispersion of Graphene Nanoplatelets and Condensation Product (Ratio 1:5) Starting from Graphite.

50 g of commercial intercalated graphite (hereinafter IG=intercalated graphite) grade ES 250 F5, marketed by Graphit Kropfmühl AG, having a lateral size of approximately 300 μm, were expanded by inclusion in an induction plasma having the following characteristics:
type of plasma/auxiliary/carrier gas supply: argon
    feed rate (IG): 5 g/min
    plasma gas flow: 15 l/min
    auxiliary gas flow: 1.5 l/min
    carrier gas flow: 1 l/min
    RF: 40 MHz
    Power: ~1400 W The expansion temperature was 1300° C. and the transit time approximately 0.2 seconds. The resulting expanded graphite (EG) had an apparent density of ~2.5 g/l and a C/O ratio of approximately 150:1. The expanded graphite was then dispersed in 1000 mL of deionised water containing the condensation product of sulfonated naphthalene and formaldehyde according to the formula (Ia), marketed under the brand name Setamol WS by BASF AG, as a dispersing agent in quantities of 500% w/w of the expanded graphite, in order to obtain a suspension. The dispersing agent comprised an apolar aromatic group (naphthalene) with a high affinity for graphite, and a (sulfonated) polar group that promotes graphite-water affinity.

For the ultrasound treatment, which induces the exfoliation and dimensional reduction of the expanded graphite, an energy level of 400 W (UIP400S, Hielscher) was applied for a period of 15 hours.

The final dispersion had a graphene nanoplatelets concentration of 5% in w/w and the graphene to dispersant ratio was 1:5. This dispersion was diluted 1:1000 in deionised water and poured drop by drop onto a silicon oxide substrate placed on a plate heated to 100° C. When the substrate was analyzed under the scanning electron microscope (SEM), the graphene nanoplatelets revealed a lateral size in the range of 500-3000 nm, and a thickness in the range of 0.34-15 nm.

EXAMPLE 2

Preparation of the Dispersion of Graphene Nanoplatelets and Condensation Product with Formaldehyde (Ratio 1:2) Starting from Graphite.

The procedure in Example 1 was repeated to obtain the expanded graphite, and then the following variants were introduced.

100 g of expanded graphite were dispersed in 1000 mL of deionised water containing the condensation product of sulfonated naphthalene and formaldehyde according to the formula (Ia), marketed under the brand name Setamol WS by BASF AG, as a dispersing agent in the amount of 200% w/w of the expanded graphite in order to obtain a suspension. The dispersing agent contained an apolar aromatic group (naphthalene) with a high affinity for graphite, and a (sulfonated) polar group that promotes graphite/water affinity.

For the ultrasound treatment to induce the exfoliation and dimensional reduction of the expanded graphite, an energy level of 400 W (UIP400S, Hielscher) was applied for a period of 30 hours.

The final dispersion had a graphene nanoplatelets concentration of 10% w/w.

The final dispersion was diluted 1:1000 in deionised water and poured drop by drop onto a silicon oxide substrate placed on a plate heated to 100° C. The substrate was analyzed under the scanning electron microscope (SEM) and showed that the graphene platelets had a lateral size in the range of 200-2000 nm, and a thickness in the range of 0.34-10 nm.

EXAMPLE 3

Preparation of the Dispersion of Graphene Nanoplatelets and Condensation Product with Formaldehyde (Ratio 1:1) Starting from Graphite.

The procedure of Example 1 was repeated to obtain the expanded graphite, after which the following variations were introduced.

200 g of expanded graphite were dispersed in 1000 mL of deionised water containing the condensation product of sulfonated naphthalene and formaldehyde according to the formula (Ia), marketed under the brand name Setamol WS by BASF AG, as a dispersing agent in proportions of 100% w/w of the expanded graphite, to obtain a suspension. The dispersing agent included an apolar aromatic group (naphthalene) with a high affinity for graphite and a (sulfonated) polar group that promotes the affinity between graphite and water.

For the ultrasound treatment to induce the exfoliation and dimensional reduction of the expanded graphite, an energy level of 400 W (UIP400S, Hielscher) was applied for a period of 60 hours.

The final dispersion had a graphene nanoplatelets concentration of 20% w/w and the ratio of graphene nanoplatelets to dispersant was 1:1.

The final dispersion was diluted 1:1000 in deionised water and poured drop by drop onto a silicon oxide substrate placed on a plate heated to 100° C. The substrate was analyzed with the scanning electron microscope (SEM) and it was found that the graphene platelets had a lateral size in the range of 200-1000 nm, and a thickness in the range of 0.34-6 nm.

EXAMPLE 4

Preparation of the Dispersion of Graphene Nanoplatelets and Condensation Product with Formaldehyde (Ratio 1:1)

Pure anhydrous graphene nanoplatelets were obtained with the following characteristics. The lateral sizes of the graphene particles averaged less than 15 μm, and the thickness less than 8 nm, with a surface area in the range of 200 and 400 $m^2/g$. The C/O ratio was higher than 100:1. 100 g of graphene nanoplatelets powder were dispersed in 1000 mL of deionised water containing the condensation product of sulfonated naphthalene and formaldehyde according to the formula (Ia), marketed under the brand name Setamol WS by BASF AG, as a dispersing agent in the amount of 100% w/w of the expanded graphite to obtain a suspension. The dispersing agent consisted of an apolar aromatic group (naphthalene), with a high affinity for graphite, and a (sulfonated) polar group that promotes the affinity between graphite and water. The ingredients were mixed for several minutes with a stirrer or by means of an ultrasound treatment to obtain a homogeneous dispersion. The final dispersion had a graphene concentration of 10% w/w and a graphene to dispersant ratio of 1:1.

EXAMPLE 5

Preparation of a Dispersion of Graphene Nanoplatelets and Condensation Product with Formaldehyde and Urea (Ratio 1:1)

Pure anhydrous graphene nanoplatelets were obtained with the following characteristics. The lateral sizes of the graphene nanoplatelets averaged less than 15 μm, and the thickness less than 8 nm, with a surface area in the range of 200 and 400 $m^2/g$. The C/O ratio was higher than 100:1. 100 g of graphene nanoplatelets powder were dispersed in 1000 mL of deionised water containing the condensation product of hydroxyl benzene sulfonic acid of formula Ig, urea and formaldehyde, marketed by the Chemwill Asia Co. Ltd. This condensation product was used as a dispersing agent in the amount of 100% w/w of the expanded graphite to obtain a suspension. The ingredients were mixed for several minutes with a stirrer to obtain a homogeneous dispersion. The final dispersion had a graphene nanoplatelets concentration of 10% w/w and a graphene nanoplatelets to dispersing agent ratio of 1:1.

EXAMPLE 6

Preparation of a Dispersion of Graphene Nanoplatelets and Condensation Product with Formaldehyde (Ratio 1:1)

Pure anhydrous graphene nanoplatelets were obtained with the following characteristics. The lateral sizes of the graphene particles averaged less than 15 μm, and the thickness less than 8 nm, with a surface area in the range of 200 and 400 $m^2/g$. The C/O ratio was higher than 100:1. 100 g of graphene nanoplatelets powder were dispersed in 1000 mL of deionised water containing the condensation product of naphthalene sulfonic acid (formula Ia) and methyl naphthalene sulfonic acid (formula Ie, with R=methyl) with formaldehyde marketed under the brand name Supragil MNS 88 by RHODIA. This condensation product was used as as a dispersing agent in the amount of 100% w/w of the expanded graphite to obtain a suspension. The ingredients were mixed for several minutes by means of an ultrasound treatment to obtain a homogeneous dispersion. The final dispersion had a graphene nanoplatelets concentration of 10% w/w and a graphene to dispersing agent ratio of 1:1.

EXAMPLE 7

Horizontal Flammability Tests with the Flame Retardant Composition of Example 1

Specimens of rigid polyethylene terephthalate foam (PET, BASF) were prepared in accordance with the standards. Each specimen was subsequently treated with a dispersion of graphene nanoplatelets and dispersing agent prepared as in Example 1, and consequently with a graphene nanoplatelets to dispersing agent ratio of 1:5. The composition was painted over the whole surface of the specimen to obtain a homogeneous coating. The coating was then dried by means of a warm airflow. After drying, the weight of the coating could be calculated from the difference between the weight of the virgin specimen and the weight of the treated specimen, which amounted to 11%. The specimens were submitted to horizontal flammability tests in accordance with ASTM D635. The results are given in Table 1, by comparison with the results obtained for an untreated reference specimen. The table shows the type of coating in terms of the ratio of graphene nanoplatelets to dispersing agent (Specimen), the percentage weight of the coating vis-à-vis the original untreated specimen (Weight of coating), the time taken by the flame to reach the first reference point at 25 mm ($T_1$), the time taken by the flame to reach the second reference point at 100 mm ($T_2$), any flame dropping from the specimen during the test (Drop), any ignition of the cotton under the specimen caused by the drops, if any (Ignition), the initial weight of the specimen consisting of the polymer plus the coating ($P_{Initial}$), and the final weight of the specimen after the flame test ($P_{Final}$).

Table 1 shows that the untreated specimen burns completely, while the specimen coated with the graphene nanoplatelets and dispersing agent does not burn at all, and consequently produces no drops of flame, and thus passes the horizontal test.

EXAMPLE 8

Horizontal Flammability Tests with the Flame Retardant Composition of Example 3

Specimens of rigid polyethylene terephthalate foam (PET, BASF) were prepared and treated as described in Example 7, with the following variations.

The dispersion used to coat the specimens was as described in Example 3, and therefore with a graphene nanoplatelets to dispersant ratio of 1:1, and it was calculated that it amounted to 4% w/w of the initial untreated specimens. The results are shown in Table 1, together with the results obtained with the untreated specimens (As is) and those of Example 7. Here again, there was no ignition of the specimen, which did not burn at all, it developed no flaming drops, and it passes the horizontal flame test. It should be noted that using a formulation with a graphene nanoplatelets to dispersant ratio of 1:1 enables a considerable reduction in the weight of the coating, while retaining the same flame retardant properties of the composition.

EXAMPLE 9

Horizontal Flammability Tests with the Flame Retardant Composition of Example 5

Specimens of rigid polyethylene terephthalate foam (PET, BASF) were prepared and treated as described in Example 7, with the following variations.

The dispersion used to coat the specimens was as described in Example 5, and therefore with a graphene nanoplatelets to dispersant ratio of 1:1, and it was calculated that it amounted to 3.4% w/w of the initial untreated specimens. The results are shown in Table 1, together with the results obtained with the untreated specimens and those of Example 7. Here again, there was no ignition of the specimen, which did not burn at all, it developed no flaming drops, and it passed the horizontal flame test. It should be noted that the use of a formulation with a graphene nanoplatelets to dispersing agent ratio of 1:1 allows to achieve a considerable reduction in the weight of the coating, while retaining the same flame retardant properties of the composition.

EXAMPLE 10 CAS: 68425-94-5 (1:1)

Horizontal Flammability Tests with the Flame Retardant Composition of Example 6

Specimens of rigid polyethylene terephthalate foam (PET, BASF) were prepared and treated as described in Example 7, with the following variations.

The dispersion used to coat the specimens was as described in Example 6, and therefore with a graphene nanoplatelets to dispersing agent ratio of 1:1, and it was calculated that it amounted to 10.1% w/w of the initial untreated specimens. The results are shown in Table 1, together with the results obtained with the untreated specimens and those of Example 7. Here again, there was no ignition of the specimen, which did not burn at all, it developed no flaming drops, and it passed the horizontal flame test. It should be noted that the use of a formulation with a graphene nanoplatelets to dispersing agent ratio of 1:1 allows to achieve a considerable reduction in the weight of the coating, while retaining the same flame retardant properties of the composition.

TABLE 1

| | | HORIZONTAL TEST | | | | | | |
|---|---|---|---|---|---|---|---|---|
| Specimen | Flame retardant composition | Weight of coating | $T_1$ (s) | $T_2$ (s) | Drop | Ignition | $P_{Initial}$ (g) | $P_{Final}$ (g) |
| Untreated | none | 0 | 35 | 110 | Yes | Yes | 14.36 | 0 |
| Example 7 (1:5) | Example 1 | 11% | 0 | 0 | No | No | 17.50 | 17.40 |
| Example 8 (1:1) | Example 3 | 4% | 0 | 0 | No | No | 15.54 | 15.45 |
| Example 9 (1:1) | Example 5 | 3.4% | 0 | 0 | No | No | 15.43 | 15.43 |
| Example 10 (1:1) | Example 6 | 10.1% | 0 | 0 | No | No | 16.97 | 16.97 |

EXAMPLE 11

Vertical Flammability Tests with the flame retardant composition of Example 1

Specimens of rigid polyethylene terephthalate foam (PET, BASF) were prepared and treated as described in Example 5, with the following variations.

The dispersion used for the coating was as described in Example 1, and therefore with a graphene nanoplatelets to dispersing agent ratio of 1:5, and it was calculated at 11% w/w of the initial untreated specimen. The results are given in Table 2. In this case, there was ignition of the specimen, which burned completely, generating flaming drops that fell onto the cotton underneath. The ratio (1:5) and the weight of the coating 11% were not sufficient to pass the vertical test.

EXAMPLE 12

Vertical Flammability Tests with the Flame Retardant Composition of Example 2

Specimens of rigid polyethylene terephthalate foam (PET, BASF) were prepared and treated as described in Example 7, with the following variations.

The dispersion used for the coating was as described in Example 2, and therefore with a graphene to dispersing agent ratio of 1:2, and it was calculated at 26% w/w of the initial untreated specimen. The results are given in Table 2.

In this case, there was ignition of the specimen, but the flame front advanced more slowly. There were also no flaming drops during the test and the weight loss due to the test was only 1.5%.

EXAMPLE 13

Vertical Flammability Tests with the Flame Retardant Composition of Example 3

Specimens of rigid polyethylene terephthalate foam (PET, BASF) were prepared and treated as described in Example 7, with the following variations.

The dispersion used for the coating was as described in Example 3, and therefore the graphene to dispersing agent ratio was 1:1, and was calculated at 14% w/w of the initial untreated specimens. The results are given in Table 2. In this case, there was no ignition of the specimen. Nor were there any flaming drops developing during the test, so the specimen complies with the classification V0.

TABLE 2

VERTICAL TEST

| Specimen | Flame retardant composition | Weight of coating | $T_1$ (s) | $T_2$ (s) | Drop | Ignition | $P_{Initial}$ (g) | $P_{Final}$ (g) |
|---|---|---|---|---|---|---|---|---|
| Example 11 (1:5) | Example 1 | 11% | 1 | | Si | Si | 17.40 | 0 |
| Example 12 (1:2) | Example 2 | 26% | 2 | 22 | No | No | 19.12 | 18.85 |
| Example 13 (1:1) | Example 3 | 14% | 0 | 0 | No | No | 17.05 | 17.0 |

Comments

Horizontal flammability tests were carried out with the flame retardant compositions of Example 1, 3, 5 and 6 used in different amounts to form a flame retardant coating on a plastic specimen. The test was passed in each case.

Vertical flammability tests were carried out with the flame retardant compositions of Example 1, 2 and 3, used in different amounts to form a flame retardant coating on a plastic specimen. The test was passed in the case of the flame retardant compositions of Examples 2 and 3. Example 11, which used the flame retardant composition of Example 1, passed the horizontal test but did not pass the vertical test. It is nevertheless a useful flame retardant composition since certain applications require that only the horizontal test is passed.

The invention claimed is:

1. A flame retardant composition comprising graphene nanoplatelets and a condensation product of a sulfonated aromatic compound with formaldehyde, wherein the weight ratio between the graphene nanoplatelets and the condensation product is from 1:15 to 4:1;

wherein a starting mixture of three components that form the condensation product is represented by the following formula:

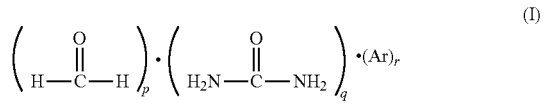

(I)

wherein Ar is a sulfonated aromatic compound selected from the group consisting of:

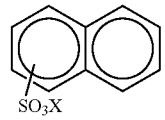
(Ia)

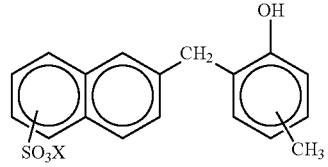
(Ib)

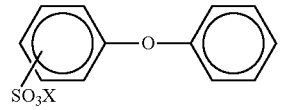
(Ic)

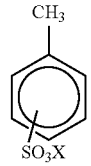
(Id)

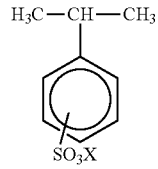
(Ie)

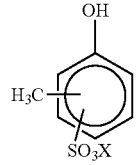
(If)

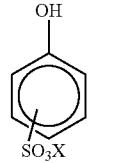
(Ig)

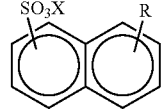
(Ih)

and X is the cation of a metal that forms a salt with the sulfonated group;

R is an alkyl group with from 1 to 12 carbon atoms, linear or branched;

p, q and r are the moles of formaldehyde, urea and sulfonated aromatic compound, respectively, with a ratio p/r from 0.2 to 4; and a ratio q/r from 0.5 to 5, in which q can be equal to 0;

wherein when q=0 the product is obtained by condensation of a sulfonated aromatic compound and formaldehyde only.

2. The flame retardant composition according to claim 1, characterized in that said condensation product of a sulfonated aromatic compound with formaldehyde has the following formula (II)

$(Ar-CH_2-)_n-Ar$ (II)

wherein:
n is from 1 to 100.

3. The flame retardant composition according to claim 1, characterized in that said condensation product is a polymer with a molecular weight Mw of up to 15,000.

4. The flame retardant composition according to claim 1, characterized by being in the form of water dispersion wherein the concentration of graphene nanoplatelets is from 1% to 40% by weight of the water dispersion, and the concentration of the condensation product is from 1 to 40% by weight of the water dispersion.

5. The flame retardant composition according to claim 1, comprising nanoplatelets of graphene in water, characterized in that:
the C/O ratio in said particles of graphene nanoplatelets is ≥10:1;
at least 90% of said nanoplatelets of graphene have a lateral size (x, y) from 200 to 20000 nm, and a thickness (z) from 0.34 to 30 nm, the lateral size being always greater than the thickness (x, y >z).

6. The flame retardant composition according to claim 5, characterized in that the concentration of said nanoplatelets of graphene is from 5% to 35% by weight of the composition.

7. The flame retardant composition according to claim 3, characterized in that said nanoplatelets of graphene have a lateral size (x, y) from 500 to 10000 nm.

8. The flame retardant composition according to claim 5, characterized in that said nanoplatelets of graphene have a thickness (z) from 0.34 to 20 nm.

9. The flame retardant composition according to claim 5, characterized in that said C/O ratio in said nanoplatelets of graphene is ≥100:1.

10. The flame retardant composition according to claim 2, characterized in that said condensation product has the formula Ar—CH$_2$—Ar wherein Ar is the compound of formula (Ia).

11. A polymeric article comprising a flame retardant composition comprising graphene nanoplatelets and a condensation product of a sulfonated aromatic compound with formaldehyde, wherein the weight ratio between the graphene nanoplatelets and the condensation product is from 1:15 to 4:1;
wherein a starting mixture of three components that form the condensation product is represented by the following formula:

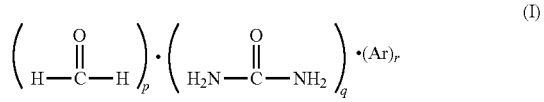
(I)

wherein Ar is a sulfonated aromatic compound selected from the group consisting of:

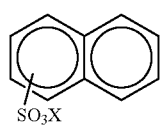
(Ia)

(Ib)

(Ic)

(Id)

(Ie)

(If)

(Ig)

(Ih)

and X is the cation of a metal that forms a salt with the sulfonated group;
R is an alkyl group with from 1 to 12 carbon atoms, linear or branched;
p, q and r are the moles of formaldehyde, urea and sulfonated aromatic compound, respectively, with a ratio p/r from 0.2 to 4; and a ratio q/r from 0.5 to 5, in which q can be equal to 0;
wherein when g=0 the product is obtained by condensation of a sulfonated aromatic compound and formaldehyde only.

12. The article according to claim 11, wherein said composition forms a coating layer.

13. The flame retardant composition according to claim 1, wherein the weight ratio between the graphene nanoplatelets and the condensation product is from 1:10 to 2:1.

14. The flame retardant composition according to claim 1, wherein the weight ratio between the graphene nanoplatelets and the condensation product is from 1:5 to 1:1.

15. The flame retardant composition of claim 8, wherein said nanoplatelets of graphene have a thickness (z) from 0.34 to 15 nm.

16. The flame retardant of claim 1, wherein X is the cation of an alkali metal.

17. The flame retardant of claim 16, wherein the alkali metal is sodium.

18. The flame retardant of claim 1, wherein the ratio p/r is from 0.5 to 2.

19. The flame retardant of claim 1, wherein the ratio q/r is from 1 to 3.

20. The flame retardant of claim 3, wherein the molecular weight Mw is up to 10,000.

21. The flame retardant of claim 6, wherein the concentration of said nanoplatelets of graphene is from 10% to 20% by weight of the composition.

22. The flame retardant of claim 7, wherein said nanoplatelets of graphene have a lateral size (x, y) from is from 1000 to 5000 nm.

* * * * *